(12) United States Patent
Yi et al.

(10) Patent No.: US 12,166,202 B2
(45) Date of Patent: Dec. 10, 2024

(54) CATHODE WITH COATED DISORDERED ROCKSALT MATERIAL

(71) Applicant: Wildcat Discovery Technologies, Inc., San Diego, CA (US)

(72) Inventors: Tanghong Yi, San Diego, CA (US); Bin Li, San Diego, CA (US); Sun-Ho Kang, San Jose, CA (US); Yunguang Zhu, Santa Clara, CA (US); Han Wang, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 0 days.

(21) Appl. No.: 18/684,021

(22) PCT Filed: Aug. 26, 2022

(86) PCT No.: PCT/US2022/041661
§ 371 (c)(1),
(2) Date: Feb. 15, 2024

(87) PCT Pub. No.: WO2023/034137
PCT Pub. Date: Mar. 9, 2023

(65) Prior Publication Data
US 2024/0297303 A1   Sep. 5, 2024

Related U.S. Application Data

(60) Provisional application No. 63/260,749, filed on Aug. 31, 2021.

(51) Int. Cl.
*H01M 4/04* (2006.01)
*H01M 4/02* (2006.01)
(Continued)

(52) U.S. Cl.
CPC ......... *H01M 4/366* (2013.01); *H01M 4/0471* (2013.01); *H01M 4/485* (2013.01);
(Continued)

(58) Field of Classification Search
CPC ............... H01M 4/366; H01M 4/0471; H01M 4/5825; H01M 4/625; H01M 4/485; H01M 2004/028
See application file for complete search history.

(56) References Cited

U.S. PATENT DOCUMENTS 8,535,832 B2   9/2013   Karthikeyan et al.
8,722,250 B2   5/2014   Park et al.
(Continued)

FOREIGN PATENT DOCUMENTS

CN   107546384 A   1/2018
CN   109987650 A   7/2019
(Continued)

OTHER PUBLICATIONS

Han, Binghong et al. "Tailoring Alumina Based Interphases on Lithium Ion Cathodes", Journal of the Electrochemical Society, 165 (14) A3275-A3283 (2018) (10 pages).

Huang, Baojun et al. "Enhanced Cycling Stability of Cation Disordered Rock-Salt Li1.2Ti0.4O2 Material by Surface Modification With Al2O3", Frontiers in Chemistry, Mar. 2019, vol. 7, Article 107 (2 pages).

(Continued)

*Primary Examiner* — Sarah A. Slifka
(74) *Attorney, Agent, or Firm* — Young Basile Hanlon & MacFarlane, P.C.

(57) ABSTRACT

A cathode includes a disordered rocksalt phase material and a coating layer disposed on a surface of the disordered rocksalt phase material. The coating layer may include one or more of an oxide, a phosphate, a phosphide, or a fluoride.

20 Claims, 7 Drawing Sheets

(51) Int. Cl.
  *H01M 4/36* (2006.01)
  *H01M 4/485* (2010.01)
  *H01M 4/58* (2010.01)
  *H01M 4/62* (2006.01)

(52) U.S. Cl.
  CPC ......... *H01M 4/5825* (2013.01); *H01M 4/625* (2013.01); *H01M 2004/028* (2013.01)

(56) References Cited

U.S. PATENT DOCUMENTS

| | | | |
|---|---|---|---|
| 9,083,062 | B2 | 7/2015 | Kumar et al. |
| 9,093,712 | B2 | 7/2015 | Kato et al. |
| 9,692,043 | B2 | 6/2017 | Takeuchi et al. |
| 9,780,363 | B2 | 10/2017 | Ceder et al. |
| 9,865,872 | B2 | 1/2018 | Nakahara et al. |
| 10,280,092 | B2 | 5/2019 | Carroll et al. |
| 10,497,928 | B2 | 12/2019 | Asano et al. |
| 10,833,315 | B2 | 11/2020 | Nakatsutsumi et al. |
| 10,833,322 | B2 | 11/2020 | Natsui et al. |
| 10,957,901 | B2 | 3/2021 | Ceder et al. |
| 11,870,056 | B2 | 1/2024 | Yi et al. |
| 2013/0095385 | A1 | 4/2013 | Tran et al. |
| 2014/0099549 | A1 | 4/2014 | Ceder et al. |
| 2018/0320284 | A1 | 11/2018 | Opalka et al. |
| 2020/0020943 | A1 | 1/2020 | Natsui et al. |
| 2020/0194790 | A1 | 6/2020 | Ceder et al. |
| 2021/0005883 | A1 | 1/2021 | Natsui et al. |
| 2021/0167373 | A9 | 6/2021 | Ceder et al. |

FOREIGN PATENT DOCUMENTS

| | | |
|---|---|---|
| CN | 111952560 A | 11/2020 |
| KR | 20130045268 A | 5/2013 |
| KR | 20150065840 A | 6/2015 |
| WO | 2014055665 A2 | 4/2014 |

OTHER PUBLICATIONS

International Search Report and Written Opinion in co-pending International Application No. PCT/US2022/41661 mailed Dec. 15, 2022 (10 pages).

Lee et al. "Mitigating oxygen loss to improve the cycling performance of high capacity cation-disordered cathode materials." Nat. Commun. 8:981 (10 pages).

Lun, Zhengyan et al. "Cation-disordered rocksalt-type high-entropy cathodes for Li-ion batteries", Nature Materials, vol. 20, Feb. 2021, pp. 214-221 (30 pages).

Wang et al. "A disordered rock-salt Li-excess cathode material with high capacity and substantial oxygen redox activity: Li1.25Nb0.25Mn0.5O2." Electrochemistry Communications 60; 2015 (4 pages).

Yabuuchi et al. "High-capacity electrode materials for rechargeable lithium batteries: Li3NbO4-based system with cation-disordered rocksalt structure" Proc. Natl. Acad. Sci. 2015; (6 pages).

Yu, Zhenlu et al. "Synthesis and Redox Mechanism of Cation-Disordered, Rock-Salt Cathode-Material Li—Ni—Ti—Nb—O Compounds for a Li-Ion Battery", ACS Appl. Mater. Interfaces 2019, 11, 3577-35787 (19 pages).

Li, Dong et al., "Surface Coating of Li-rich Manganese-Based Layered Cathode Materials—A Short Review." Journal of the Chinese Ceramic Society, vol. 45, No. 7, Jul. 2017 (12 pages).

First Office Action issued in co-pending application CN202280059271.7 issued Aug. 31, 2024, with English translation (16 pages).

First Office Action issued in co-pending application KR10-2024-7010660 issued Sep. 13, 2024, with English translation (15 pages).

CATHODE WITH COATED DISORDERED ROCKSALT MATERIAL

This application is a United States National Phase filing under 35 USC 371 of PCT Application PCT/US2022/041661 filed Aug. 26, 2022, published as WO2023/034137, which claims priority from provisional application U.S. 63/260,749 filed Aug. 31, 2021, all of which are incorporated herein by reference in their entirety for all purposes.

BACKGROUND

The present invention is in the field of battery technology, and, more particularly in the area of high-energy materials for use in cathodes of electrochemical cells.

Lithium metal oxides are high energy density materials often used in lithium ion batteries. One form or class of lithium metal oxides is disordered rocksalt structures. Compounds represented by the formula (1):

$$xLi_3NbO_4 \cdot (1-x)LiMO_2 \quad (1)$$

where M is a trivalent cation, have been shown to be a promising for use as cathodes in lithium ion batteries. Disordered rocksalt compositions, such as the compositions represented by formula (1), generally have a random atomic arrangement of lithium and transition metal ions closely packed in a cubic structure. These disordered rocksalt compositions can more lithium atoms per formula unit than conventional lithium-excess layered materials.

The disordered rocksalt structure is an attractive cathode material for next generation lithium ion batteries due to high specific energy density. For example, certain disordered rocksalt structure materials have a theoretical gravimetric energy density of about 1120 Wh/kg. The disordered rocksalt materials also can be formed using relatively low cost raw materials, such as manganese. As such, the disordered rocksalt materials can achieve relatively high energy density with relatively low material cost. In order to achieve comparable energy density, other types of known cathode materials use higher-cost raw materials, such as cobalt and/or nickel.

One challenge of using disordered rocksalt materials in secondary batteries is poor capacity retention when cycling. The poor capacity retention may be attributable to instability of anionic redox and high voltage cycling, which result in side reactions during charging. The side reactions may involve residual lithium salts, such as lithium hydroxide (LiOH) and lithium carbonate ($Li_2CO_3$), which may be present on the surface of lithium-rich materials and are detrimental to electrochemical performance of batteries. Disordered rocksalt materials also may have residual lithium salts based on the pH value of the cathode material. The by-products of side reactions could increase the cell resistance, and large cell resistance can reduce the cycle life of the disordered rocksalt material due to overpotential. The true state of charge (SOC) and depth of discharge (DOD) range shrinks with increasing number of cycles, which results in reduced cycle capacity.

BRIEF SUMMARY

Embodiments of the inventive subject matter described herein are directed to improving the cycle performance of electrochemical cells that have disordered rocksalt cathodes. For example, the embodiments described herein may increase the capacity retention of the electrochemical cells by stabilizing the disordered rocksalt material. The disordered rocksalt material is stabilized by applying a coating layer on the surface of the disordered rocksalt material.

In one or more embodiments, a cathode is provided that includes a disordered rocksalt phase material and a coating layer disposed on a surface of the disordered rocksalt phase material. The coating layer may include one or more of an oxide, a phosphate, phosphide, or a fluoride. Desirably, the layer includes a phosphate, phosphide or combination thereof Optionally, the disordered rocksalt phase material is represented by chemical formula (i):

$$Li_xN_yM_zO_{b-a}F_a \quad (i)$$

where $1.0 < x < 1.65$; $0 \leq y < 0.55$; $0.1 < z < 1$; $0 \leq a < 0.8$; $1 \leq b \leq 3$; N is one of Nb, Ti, Ta, Zr, W, Sb, or Mo; and M is one of Ti, V, Cr, Mn, Fe, Co, Ni, Cu, Zn, Al, Zr, Y, Mo, Ru, Rh, or Sb. Optionally, b=2.

Optionally, the coating layer is present at no less than 0.05 wt. % and no greater than 10 wt. % relative to a combined weight of the disordered rocksalt phase material and the coating layer. Optionally, the coating layer is present at 5 wt. % relative to the combined weight of the disordered rocksalt phase material and the coating layer. Optionally, the coating layer is present at 2 wt. % relative to the combined weight of the disordered rocksalt phase material and the coating layer.

Optionally, the coating layer comprises one or more of $LiAlO_2$, $Li_3Al_2(PO_4)_3/AlPO_4$, $Li_3PO_4$, or $Li_2TiO_3/TiO_2$.

Optionally, the disordered rocksalt phase material has an Fm-3m crystallographic structure.

In one or more embodiments, a method for forming a cathode is provided. The method includes synthesizing a disordered rocksalt phase material and mixing the disordered rocksalt phase material with one or more coating precursors to form a mixture. The precursor may be one that desirably forms a lithium phosphate, lithium metal phosphate, lithium phosphide, lithium metal phosphide or combination thereof. The one or more coating precursors may include one or more of $Al(CH_3CO_2)_3$, $AlPO_4$, $H_3PO_4$, $NH_4H_2PO_4$, or $TiO_2$. The method may also include annealing the mixture to form a coated disordered rocksalt powder that has a coating layer disposed on a surface of the disordered rocksalt phase material. Illustratively, the precursor may be one that decomposes during annealing to form phosphoric acid, phosphine or combination thereof that may then react with surface species commonly on lithium metals such as lithium carbonate, lithium oxide, and lithium hydroxide resulting in the formation of lithium phosphate, lithium phosphide or combination thereof. Another illustration may be the use of phosphine gas with or without a further liquid or solid precursor to tailor the ultimate desired coating composition. When the lithium phosphate and lithium phosphide are present, they may be present in any desirable ratio in the coating and typically ranges from lithium phosphate/lithium phosphide from 0.01, 0.1, 0.5 to 100, 90, 5 or 2.

The coating layer may be comprised of one or more of $LiAlO_2$, $Li_3Al_2(PO_4)_3/AlPO_4$, $Li_3PO_4$, $Li_3P$, and $Li_2TiO_3/TiO_2$.

Optionally, the annealing includes heating the mixture at a temperature no less than 200° C., and no greater than 800° C. for a duration no less than 0.5 hours and no more than 24 hours. Optionally, the annealing includes heating the mixture in a presence of argon (Ar) gas flow.

Optionally, the method further includes milling the coated disordered rocksalt powder with one or more carbon precursors after the annealing to produce a cathode active material.

Optionally, synthesizing the disordered rocksalt phase material includes milling a suspension of rocksalt precursors in a solvent to form a precursor mixture, drying the precursor mixture, and annealing the precursor mixture after the drying to produce the disordered rocksalt phase material. The rocksalt precursors illustratively may include one or more of MnO, $Mn_2O_3$, $Li_2CO_3$, LiF, LiOH, $Nb_2O_5$, or $NbF_5$.

In one or more embodiments, a secondary battery is provided that includes an anode, a cathode, and an electrolyte. The cathode is capable of reversible exchange of lithium ions. The cathode includes a disordered rocksalt phase material having a coating as described herein. The electrolyte includes an organic solvent and a lithium salt.

Optionally, the disordered rocksalt phase material has an Fm-3m crystallographic structure.

Optionally, the disordered rocksalt phase material is represented by chemical formula (i):

$$Li_xN_yM_zO_{b-a}F_a \qquad (i)$$

where $1.0 < x < 1.65$; $0 \leq y < 0.55$; $0.1 < z < 1$; $0 \leq a < 0.8$; $1 \leq b \leq 3$; N is one of Nb, Ti, Ta, Zr, W, Sb, or Mo; and M is one of Ti, V, Cr, Mn, Fe, Co, Ni, Cu, Zn, Al, Zr, Y, Mo, Ru, Rh, or Sb. Optionally, b=2.

The coating may be comprised of one or more of $LiAlO_2$, $Li_3Al_2(PO_4)_3/AlPO_4$, $Li_3PO_4$, $Li_3P$, and $Li_2TiO_3/TiO_2$. The layer may be comprised of a lithium phosphate, lithium phosphide or combination thereof.

The coating layer may be present in an amount of about 0.05, 0.1, 0.2, 0.5 or 1 wt. % to 10, 7, 5 or 3 wt % of the weight of the disordered rocksalt phase material and the coating layer.

DETAILED DESCRIPTION

Figure 1:
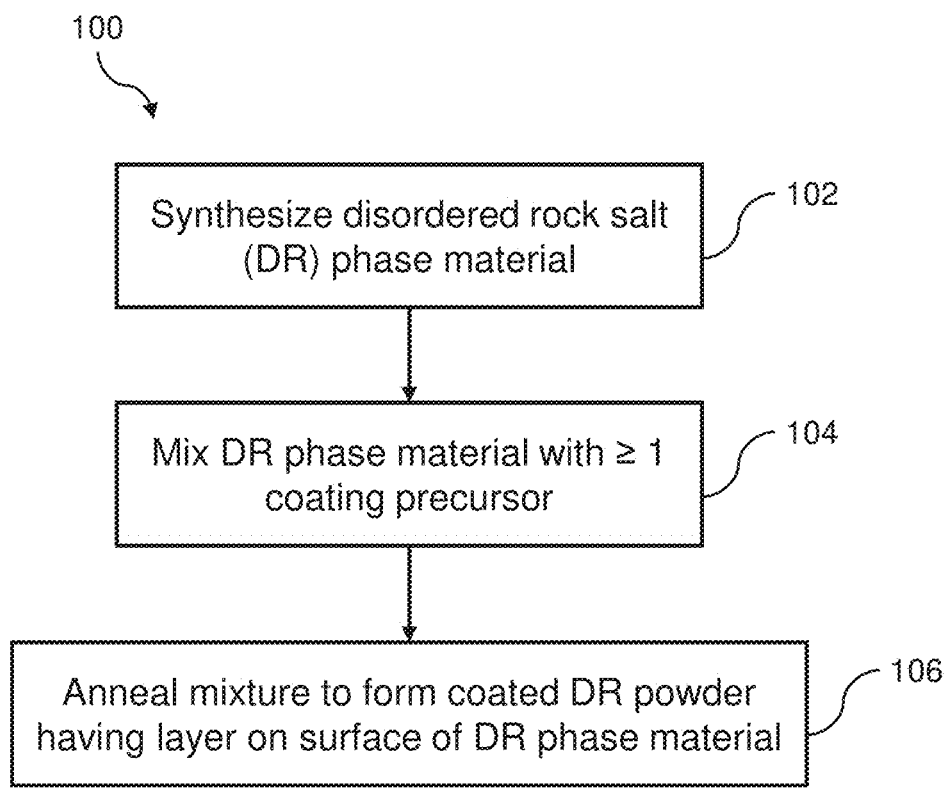
FIG. 1 is a flow chart of a method for forming a cathode according to an embodiment.

The following definitions apply to aspects described with respect to one or more embodiments of the inventive subject matter. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The term "active material" refers to the material in an electrode, particularly in a cathode, that donates, liberates, or otherwise supplies the conductive species during an electrochemical reaction in an electrochemical cell.

The term "metal" refers to alkali metals, alkaline earth metals, transition metals, lanthanides, and actinides as those terms are understood by one of ordinary skill in the art or as defined herein. The term "alkali metal" refers to any of the chemical elements in group 1 of the periodic table, including lithium (Li), sodium (Na), potassium (K), rubidium (Rb), cesium (Cs), and francium (Fr). The term "alkaline earth metal" refers to any of the chemical elements in group 2 of the periodic table, including beryllium (Be), magnesium (Mg), calcium (Ca), strontium (Sr), barium (Ba), and radium (Ra). The term "transition metal" refers to a chemical element in groups 3 through 12 of the periodic table, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), and meitnerium (Mt). The term "post-transition metal" refers to aluminum (Al), gallium (Ga), germanium (Ge), indium (In), tin (Sn), antimony (Sb), thallium (Tl), lead (Pb), bismuth (Bi), and polonium (Po).

The rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

To the extent certain battery characteristics can vary with temperature, such characteristics are specified at 30 degrees Celsius (° C.), unless the context clearly dictates otherwise.

Ranges presented herein are inclusive of their endpoints. Thus, for example, the range 1 to 3 includes the values 1 and 3 as well as the intermediate values between the endpoints.

Embodiments of the inventive subject matter provide disordered rocksalt compositions and morphology (e.g., structure) for use in formulating cathodes of electrochemical cells. The electrochemical cells that utilize the disordered rocksalt materials disclosed herein may be secondary (e.g., rechargeable) batteries. The secondary batteries may be lithium ion batteries. The lithium ion battery includes an electrolyte formulation with a lithium salt present at a concentration suitable for conducting the lithium ions through the electrolyte formulation between electrodes (e.g., a cathode and an anode) during the discharge and recharge operations. For example, discharge and recharge of the lithium ion battery may be accomplished by exchange of lithium ions into and from the cathode and the anode. The exchange may be characterized by intercalation and de-intercalation of the lithium ions and/or via conversion. For example, some lithium ions may be exchanged via intercalation and other lithium ions may be exchanged via conversion. According to at least one embodiment, the cathode includes disordered rocksalt material.

In a disordered rocksalt composition, both lithium and a transition metal occupy a cubic close-packed lattice of octahedral sites. The disordered rocksalt phase may have an Fm-3m rocksalt crystallographic structure. In electrochemical reactions, lithium diffusion proceeds by lithium ions hopping from one octahedral site to another octahedral site via an intermediate tetrahedral site. Lithium in the intermediate tetrahedral site is the activated state in lithium diffusion. The activated tetrahedral lithium ion shares faces with four octahedral sites as follows: (i) the site previously occupied by the lithium ion itself; (ii) the vacancy the lithium ion will move into; and (iii & iv) two sites that can be occupied by lithium, a transition metal, or a vacancy.

The disordered rocksalt phase materials of the cathode described herein can have various compositions. The disordered rocksalt chemical composition generally includes lithium, transition metals, and oxygen. One or more of the transition metal or oxygen sites may be doped with another element for improved electrochemical performance. In a non-limiting example, the oxygen site is doped with fluorine. A chemical formula of a disordered rocksalt phase material for potential doping at the oxygen site is formula (i):

$$Li_xN_yM_zO_{b-a}F_a \quad (i)$$

where $1.0<x<1.65$; $0 \leq y<0.55$; $0.1<z<1$; $0 \leq a<0.8$; $1 \leq b \leq 3$; N is one of Ti, Ta, Zr, W, Nb, Sb, or Mo; and M is one of Ti, V, Cr, Mn, Fe, Co, Ni, Cu, Zn, Al, Zr, Y, Mo, Ru, Rh, or Sb. In an embodiment, $y>0.01$. In an embodiment, $b=2$. In a non-limiting example, $x+y+z=b$, so the atomic ratio of metals (e.g., Li, N, and M) to non-metals (e.g., O and F) is even. It is recognized that defects and/or an anion deficiency may occur, which would make the sums deviate. These compositions have demonstrated excellent specific capacity or energy density, such as ~350 mAh/g at 55° C., and C/40, and ~300 mAh/g at 30° C., and C/15.

When $a>0$, the presence of fluorine dopants at the oxygen site in the disordered rocksalt may improve the electrochemical performance of the lithium ion battery cell. Without being bound by a particular theory or mechanism of action, anionic substitution of fluorine for oxygen (forming a oxyfluoride) can enhance cycling performance by having a greater resistance to hydrogen fluoride attack from electrolyte decomposition at high voltage. Alternatively, the higher ionicity in the metal-fluorine bond over that of the metal-oxygen bond can result in less transition metal leaching from the cathode to the electrolyte, further stabilizing the structure. Several disordered rocksalt material compositions are disclosed in U.S. application Ser. No. 15/222,377 (now U.S. Pat. No. 10,280,092), which is incorporated by reference herein in its entirety.

Optionally, the disordered rocksalt composition may lack niobium (Nb). The N and/or M metal sites optionally may be doped instead of the oxygen site, or in addition to the oxygen site.

The cathode according to one or more embodiments has a coating layer on a surface of the disordered rocksalt phase material. The coating modifies the surface of the disordered rocksalt material to improve cycle performance of the battery. For example, the coating provides a more stable and/or more conductive surface of the disordered rocksalt material (relative to formulations that lack a coating on the surface of the disordered rocksalt material), which may reduce side reactions with lithium salts and other compounds in the electrolyte. The coating may also stabilize by reducing over-potential. Consequently, the coating improves cycle stability (e.g., capacity retention) within a range of operating temperatures, including room temperature.

The coating is formed on the surface of the disordered rocksalt phase material using oxide and/or phosphate coating precursors. For example, the coating precursors may include one or more phosphorous containing compounds (e.g., phosphates, phosphides, and phosphites) oxides, fluorides, silicates, nitrides, carbonates, nitrates, borates, sulfates, acetates, or the like. Specific examples of coating precursors include, but are not limited to, aluminum acetate ("AlAc") ($Al(CH_3CO_2)_3$), aluminum phosphate ($AlPO_4$), phosphorous acid ($H_3PO_3$) ammonium dihydrogen phosphate ($NH_4H_2PO_4$), and titanium oxide ($TiO_2$). For example, the coating layer may be formed using only one of the listed coating precursors or multiple of the listed precursors in combination. In addition, a gas that reacts with surface species on the lithium metal may be introduced during annealing such as phosphine ($PH_3$) to react with one or more species present in or on the lithium metal such as to form a lithium phosphide. The gas may arise as well from the decomposition of a solid or liquid precursor such as the decomposition of phosphorous acid. The precursors may react with lithium ions present on the surface of the disordered rocksalt material to form a thin coating layer that covers the surface. The lithium ions may be residually present from the synthesis of the underlying disordered rocksalt phase material. The specific type and amount of coating precursor(s) used may be selected based on various factors, such as the specific precursors used to synthesize the disordered rocksalt phase. For example, some coating precursors may be more compatible with a specific disordered rocksalt composition than another disordered rocksalt composition. Compatibility in this context refers to the ability for the coating precursors to form and maintain a coating layer on the surface of the disordered rocksalt phase. Other factors may include the reactivity of the coating precursor(s) to the disordered rocksalt phase, the conductivity of the coating precursor(s), and the like. For example, the coating precursors may be selected such that the resulting coating layer stabilizes the disordered rocksalt phase (e.g., by reducing side-reactions) without significantly increasing resistance to ion transport and/or electron transport to and from the cathode.

The composition of the coating layer is based on the specific coating precursor(s) used in the synthesis process. The coating layer composition may include or represent an oxide, a fluoride, a phosphate, a silicate, a nitride, a carbonate, a nitrate, a borate, and/or a sulfate. Non-limiting examples of the coating layer composition include lithium aluminate ($LiAlO_2$), aluminum phosphate-doped aluminum-stabilized NASICON-structured material ($Li_3Al_2(PO_4)_3$/$AlPO_4$), lithium phosphate ($Li_3PO_4$), and/or titanium oxide-doped lithium titanate ($Li_2TiO_3/TiO_2$). For example, the $AlPO_4$ precursor can be used to produce a coating that includes $Li_3Al_2(PO_4)_3/AlPO_4$. The $Al(CH_3CO_2)_3$ can yield a coating that includes $LiAlO_2$. The $NH_4H_2PO_4$ precursor can yield a coating that includes $Li_3PO_4$, and the $TiO_2$ precursor can produce $Li_2TiO_3/TiO_2$ in the coating. Optionally, multiple coating precursors can be utilized, resulting in a coating layer that includes multiple compounds. For example, the coating layer may include more than one of $LiAlO_2$, $Li_3Al_2(PO_4)_3/AlPO_4$, $Li_3PO_4$, and $Li_2TiO_3/TiO_2$. The coating layer can have other compositions in other embodiments, such as if a precursor other than $Al(CH_3CO_2)_3$, $NH_4H_2PO_4$, $AlPO_4$, and $TiO_2$ is used instead of, or in addition to, one or more of the listed precursors. Another desirable illustration is the use of phosphorous acid, which may decompose to form phosphoric acid and phosphine that may result in a coating comprised of lithium phosphide, lithium metal phosphide, lithium metal phosphate and lithium phosphate. The metal of the phosphide and phosphate may be any suitable metal such as a transition metal and aluminum and may include those metals described herein including those useful for making the disordered rocksalt.

The amount of the coating material relative to the disordered rocksalt phase may also affect the cycle performance of the battery. In one or more embodiments, the coating layer is present between 0.05 wt. % and 10 wt. % (e.g., at no less than 0.05 wt. % and no greater than 10 wt. %) relative to the combined weight of the disordered rocksalt phase material and the coating layer. For example, the content of the coating may be 0.05 wt. %, 0.1 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, or any non-zero intermediate amount (0-10 wt. %). In a first non-limiting example, the coating layer is present at 2 wt. %. The coating layer is present at 5 wt. % in a second non-limiting example.

The coated disordered rocksalt material can be used as the active material of the cathode in a battery. For example, the coated disordered rocksalt can be formed as a composite cathode film on a metal current collector. The coated disordered rocksalt cathode generally provides improved initial Coulombic efficiency (CE) and cycle capacity retention, without a substantial reduction in initial capacity relative to a control cell that has uncoated disordered rocksalt material, as described herein. The beneficial initial CE and capacity retention results indicate that the coatings help insulate the disordered rocksalt phase from side reactions with compounds in the electrolyte during charging.

FIG. 1 is a flow chart 100 of a method for forming a cathode according to an embodiment. The method may be performed using laboratory and/or industrial equipment. More specifically, the method is used to produce a cathode active material that has a coated disordered rocksalt crystallographic structure. The method may include more steps, fewer steps, and/or different steps than shown in FIG. 1.

At 102, a disordered rocksalt phase material is synthesized. The disordered rocksalt materials may be synthesized via solid state chemistry synthesis. For example, a suspension of rocksalt precursors may be prepared by mixing the rocksalt precursors in a solvent. The rocksalt precursors include metal compounds, such as manganese oxide ($Mn_2O_3$), lithium carbonate ($Li_2CO_3$), lithium fluoride (LiF), lithium hydroxide (LiOH), niobium pentoxide ($Nb_2O_5$), and/or niobium fluoride ($NbF_5$). The solvent may include deionized water. The precursors may be added at specific stoichiometric amounts according to the desired composition of the disordered rocksalt phase material. The suspension is then milled to form a precursor mixture. The milling may be performed using a planetary ball mill to break down the particle size and homogenize the mixture. The milling may be performed using other equipment in other embodiments.

After milling, the precursor mixture is dried and then annealed. For example, the precursor mixture may be dried at 100° C. for 12 hours in the presence of air flow. The anneal process may include heating the dried mixture at a temperature between 750° C., and 900° C. for between 6 and 24 hours. The anneal process produces the disordered rocksalt phase. For example, the heat causes the precursors to react and form a unitary phase. The conditions of the annealing step are selected to provide a desired crystallographic structure during calcination. For example, the conditions are selected such that the resulting disordered rocksalt phase material has an Fm-3m crystallographic structure. Annealing at temperatures outside of the specified range and/or for durations outside of the specified time range may undesirably affect the crystallographic structure that is formed. Optionally, the anneal process may be performed in the presence of gas flow, such as argon (Ar). Alternatively, the annealing environment may be nitrogen gas ($N_2$) or air instead of Ar.

The disordered rocksalt phase material that is synthesized may have the following chemical formula (i):

$$Li_xN_yM_zO_{b-a}F_a \qquad (i)$$

where $1.0<x<1.65$; $0\leq y<0.55$; $0.1<z<1$; $0\leq a<0.8$; $1\leq b\leq 3$; N is one of Ti, Ta, Zr, W, Nb, Sb or Mo; and M is one of Ti, V, Cr, Mn, Fe, Co, Ni, Cu, Zn, Al, Zr, Y, Mo, Ru, Rh, or Sb. In an embodiment, $y>0.01$.

At 104, the disordered rocksalt phase material is then mixed with one or more coating precursors to form a mixture. In a non-limiting example, the one or more coating precursors include $Al(CH_3CO_2)_3$, $AlPO_4$, $NH_4H_2PO_4$, and/or $TiO_2$. The coating precursor(s) may be added to the mixture at specific amounts based on the desired composition and properties (e.g., thickness) of the coating layer to be formed.

At 106, the mixture of the disordered rocksalt phase material and the coating precursor(s) is annealed to form a coated disordered rocksalt powder that has a coating layer disposed on the surface of the disordered rocksalt phase material. The anneal step (e.g., post-annealing) may include heating the mixture at a temperature between 200° C., and 800° C. for a duration between 0.5 hours and 24 hours. A narrower range of conditions includes heating the mixture at a temperature between 300° C., and 600° C. for between 10 hours and 14 hours. In one non-limiting example, the mixture may be heated at 300° C. for 12 hours. In another non-limiting example, the mixture may be heated at 600° C. for 12 hours. The heating may cause the coating precursors to react with the surface of the disordered rocksalt phase material. For example, the coating precursors may react with lithium ions present from residual lithium hydroxide, residual lithium carbonate, or present within the disordered rocksalt phase itself, forming a thin layer of coating material that covers the surface of the disordered rocksalt phase. Even if limited reaction occurs, the anneal step may cause physical deposition of a layer of the coating precursors on the surface of the disordered rocksalt phase. The anneal may be performed in the presence of Ar gas flow, or another gas flow such as $N_2$ or air. The coating layer on the surface may have the composition of a phosphate, oxide, and/or fluoride. For example, the coating layer composition may include an oxide such as $LiAlO_2$ or $Li_2TiO_3/TiO_2$, or a phosphate such as $Li_3Al_2(PO_4)_3/AlPO_4$ or $Li_3PO_4$, based on the one or more coating precursors utilized in the mixture.

In an embodiment, after the anneal step the coated disordered rocksalt powder is milled with a carbon precursor to produce a cathode active material. The carbon precursor may include acetylene black, carbon black, carbon fiber, graphite, carbon nano-tube, KJ600, and/or the like. In an embodiment, the carbon precursor and the coated disordered rocksalt powder are milled at a ratio in which the disordered rocksalt powder represents a majority portion. For example, the ratio of the coated disordered rocksalt powder to the carbon precursor may be 60:40, 70:30, 80:20, 90:10, or greater. In an embodiment, the ratio of coated disordered rocksalt powder to carbon precursor is over 90:10, such as 95:5, 96:4, or 97:3. In a non-limiting example used in experimental testing, the ratio is 96:4.

The active material may then be formed into a composite cathode film. For example, the active material powder (including the coated disordered rocksalt powder with the carbon precursor) may be mixed with one or more solvents to form a slurry. Non-limiting examples of the one or more solvents include poly(vinylidene fluoride) ("PVDF") and 1-methyl-2-pyrrolidinone ("NMP"). The resulting slurry is deposited on a metal current collector. The metal current collector may be stainless steel. Then, the slurry on the metal current collector is dried to form a composite cathode film.

The composite cathode film produced via the method described above has a coated disordered rocksalt crystallographic structure (e.g., Fm-3m structure). The composite cathode film can be utilized as the cathode in a secondary battery cell, such as a lithium ion battery cell. The battery cell includes the cathode and an anode separated by a polymer separator. The battery cell includes an electrolyte that enables lithium ion and electron transport between the cathode and the anode. The cathode active material described herein can be used in conjunction with various types and compositions of the anode and the electrolyte.

In a non-limiting example, a secondary battery is formed that includes the composite cathode material as the cathode, an anode, a separator, and an electrolyte. The battery may be formed in a high purity argon filled glovebox (M-Braun, $O_2$ and humidity content <0.1 ppm). Examples of suitable anode materials include conventional anode materials used in lithium ion batteries, such as lithium, graphite ("$Li_xC_6$"), silicon, and other carbon, silicate, or oxide-based anode materials, as well as composite alloys that combine multiple anode materials. In a non-limiting example, the anode is a lithium anode such that lithium represents at least 50 wt. % of the total weight of the anode active material. Optionally, the lithium content may be greater than 75 wt. %, such as greater than 90 wt. %. For example, the anode active material may be at least 95 wt. % or greater lithium. In an alternative embodiment, the secondary battery may be anode free, such that the battery lacks a lithium or graphite anode entirely. In this alternative embodiment, the cathode can provide the lithium ions for cell function.

The electrolyte may include at least one organic solvent and at least one lithium salt. The organic solvent(s) can include one or more carbonates, such as ethylene carbonate ("EC"), ethyl methyl carbonate ("EMC"), diethyl carbonate ("DEC"), fluoroethylene carbonate ("FEC"), trifluoropropylene carbonate ("TFPC"), propylene carbonate ("PC"), and/or the like. The lithium salt may include lithium hexafluorophosphate ("$LiPF_6$"), lithium bis(fluorosulfonyl) imide ("LiFSI"), lithium difluoro(oxalato)borate ("LiDFOB") ($LiBF_2(C_2O_4)$), and/or the like. The electrolyte may be in the liquid phase, the solid phase, a gel phase, or another non-solid phase. In one example, the electrolyte is a liquid electrolyte. In another example, the electrolyte is a solid state electrolyte. The separator may be a polymer, such as polypropylene.

In a non-limiting example composition, the electrolyte includes $LiPF_6$ in a mixture of EC and EMC solvents with an additive. The battery cell is then sealed and cycled. The battery cell may be cycled between 1.5 V and 4.6 V at 30° C.

EXPERIMENTAL

To test the performance of the coated disordered rocksalt material as the cathode active material in a secondary battery cell, several test cells were produced, cycled, and then analyzed. The compositions and processes described in these experiments are non-limiting examples. The test cells were formed according to the method described above, varying only specific properties. For example, stoichiometric amounts of rocksalt precursors ($Mn_2O_3$, $Li_2CO_3$, $Nb_2O_5$, and other dopants in oxides or fluorides form) were mixed in deionized water to make a suspension, which was ball milled with a planetary ball mill to break down the particle size as well as to prepare a homogeneous mixture of all precursors. The mixture was dried at 100° C. for 12 hours (h) under air flow before being annealed between 750-900° C. for 6-24 hours under argon flow to obtain the disordered rocksalt phase.

The disordered rocksalt phase material was then mixed with specific amounts of coating precursors, such as $Al(CH_3CO_2)_3$, $AlPO_4$, $NH_4H_2PO_4$, and $TiO_2$, followed by a post-annealing at either 300° C. for 12 h or 600° C. for 12 h, depending on the test cell, under argon flow to form a coated disordered rocksalt powder. The coated disordered rocksalt powder was then milled with a carbon precursor in a 96:4 coated disordered rocksalt powder to carbon ratio to yield the active material for cathode casting. The active material used in the test cells varied only in the type of coating precursor used, the amount of coating precursor (e.g., either 2 wt. % or 5 wt. % relative to total weight of the active material), and the annealing temperature (e.g., 300° C. or 600° C.).

Battery cells were formed in a high purity argon filled glovebox (M-Braun, $O_2$ and humidity content <0.1 ppm). The cathode was prepared by mixing the active material (e.g., the coated disordered rocksalt powder and carbon precursor) with the solvents poly(vinylidene fluoride) (Sigma Aldrich) and 1-methyl-2-pyrrolidinone (Sigma Aldrich). The resulting slurry was deposited on a stainless steel current collector and dried to form a composite cathode film. For the anode, a thin Li foil was cut into the required size. Each battery cell included the composite cathode film, a polypropylene separator, and a lithium foil anode. An electrolyte including $LiPF_6$ in a mixture of EC and EMC was used. The battery cell was sealed and cycled between 1.5-4.6 V at 30° C.

Two control test cells and sixteen candidate test cells were produced. The control test cells did not have any coating material on the disordered rocksalt material. Each of the sixteen test cells included a coating layer based on either $Al(CH_3CO_2)_3$, $AlPO_4$, $NH_4H_2PO_4$, or $TiO_2$, such that four the test cells had the $Al(CH_3CO_2)_3$ precursor, another four had the $AlPO_4$ precursor, another four has the $NH_4H_2PO_4$ precursor, and the final group of four had the $TiO_2$ precursor. Half of the sixteen test cells had an amount of the coating precursor to yield a coating layer that represents 2 wt. % of the combined weight of the disordered rocksalt phase material and the coating precursor. The remaining test cells had a greater amount of the coating precursor, such that the coating layer represents 5 wt. % of the cathode active material. Finally, the post-anneal conditions were varied to heat the test cells at two different temperatures for the same amount of time. For example, half of the test cells were annealed at 300° C., and the other half was annealed at 600° C. The test cells are identified and characterized in Tables 1 and 2 below. The test cells all had disordered rocksalt cathode material and lithium anodes and were cycled between 1.5-4.6 V at 30° C. with 0.1 C charge (0.05 C CV)/0.1 C discharge.

Table 1 shows the cycling results of test cells having coated disordered rocksalt cathodes according to embodiments, compared to a control tested cell, where all tested cells in Table 1 are post-annealed at 300° C. for 12 hours. Table 2 shows the cycling results of test cells having coated disordered rocksalt cathodes according to embodiments, compared to a control tested cell, where all tested cells in Table 2 are post-annealed at 600° C. for 12 hours. The Tables show experimental results including $1^{st}$ cycle capacity ("Cy1 Discharge Capacity") and $1^{st}$ cycle Coulombic efficiency ("Cy1 CE"). The data of the $1^{st}$ cycle capacity is in units of mAh/g, and the Coulombic efficiency is in percent (%).

TABLE 1

Cycling results of various test cells post-annealed at 300° C. for 12 hours.

| | Coating Precursor | Coating Amount | Cy1 Discharge Capacity (mAh/g) | Cy1 CE (%) |
|---|---|---|---|---|
| 1 | None (control) | 0 wt % | 277 ± 1.2 | 88.51 ± 0.09 |
| 2 | $TiO_2$ | 2 wt % | 271 ± 0.1 | 89.88 ± 0.19 |
| 3 | $NH_4H_2PO_4$ | 2 wt % | 267 ± 0.8 | 90.39 ± 0.21 |
| 4 | $AlPO_4$ | 2 wt % | 274 ± 2.5 | 89.85 ± 0.41 |
| 5 | $Al(CH_3CO_2)_3$ | 2 wt % | 241 ± 1 | 88.23 ± 0.18 |
| 6 | $TiO_2$ | 5 wt % | 268 ± 0.9 | 91.55 ± 0.11 |
| 7 | $NH_4H_2PO_4$ | 5 wt % | 257 ± 1.8 | 92.62 ± 0.03 |
| 8 | $AlPO_4$ | 5 wt % | 270 ± 1.1 | 90.96 ± 0.19 |
| 9 | $Al(CH_3CO_2)_3$ | 5 wt % | 198 ± 0.5 | 84.14 ± 0.72 |

TABLE 2

Cycling results of various test cells post-annealed at 600° C. for 12 hours.

| | Coating Precursor | Coating Amount | Cy1 Discharge Capacity (mAh/g) | Cy1 CE (%) |
|---|---|---|---|---|
| 10 | None (control) | 0 wt % | 276 ± 0.8 | 87.38 ± 0.99 |
| 11 | $TiO_2$ | 2 wt % | 271 ± 1 | 89.65 ± 0.01 |
| 12 | $NH_4H_2PO_4$ | 2 wt % | 275 ± 0.4 | 90.98 ± 0.15 |
| 13 | $AlPO_4$ | 2 wt % | 273 ± 1 | 89.66 ± 0.12 |
| 14 | $Al(CH_3CO_2)_3$ | 2 wt % | 250 ± 0.1 | 89.02 ± 0.3 |
| 15 | $TiO_2$ | 5 wt % | 268 ± 0.9 | 91.24 ± 0.25 |
| 16 | $NH_4H_2PO_4$ | 5 wt % | 252 ± 0.5 | 91.49 ± 0.32 |
| 17 | $AlPO_4$ | 5 wt % | 265 ± 0.5 | 90.74 ± 0.05 |
| 18 | $Al(CH_3CO_2)_3$ | 5 wt % | 212 ± 1.1 | 85.89 ± 0.42 |

Figure 2A:
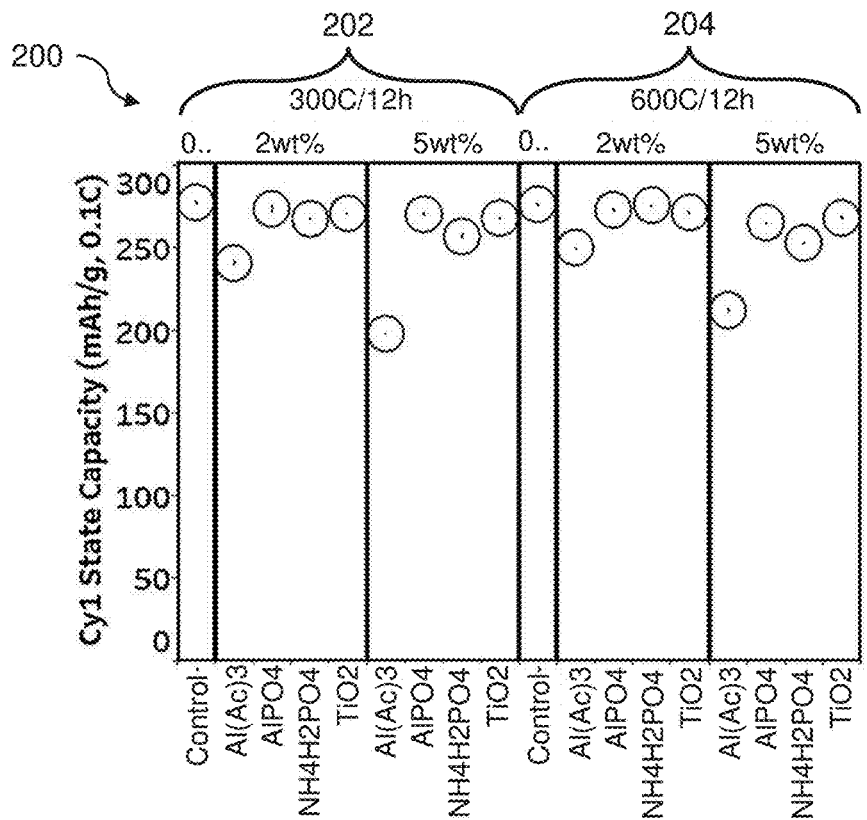
FIG. 2A is a graph plotting the initial discharge capacity for eighteen test electrochemical cells identified in Tables 1 and 2.
Figure 2B:
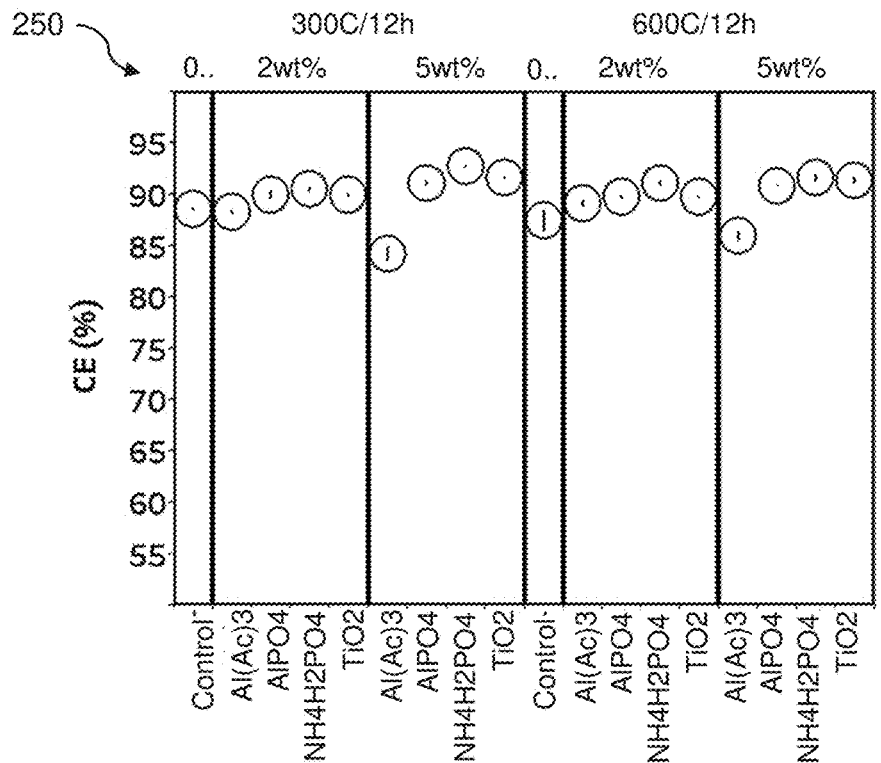
FIG. 2B is a graph plotting the Coulombic efficiency (CE) for the test cells identified in Tables 1 and 2.

The data in Tables 1 and 2 is graphed in FIGS. 2A and 2B. FIG. 2A is a graph 200 plotting the initial (first cycle) discharge capacity for the 18 test cells identified in Tables 1 and 2. In FIG. 2, the data from Table 1 (the 300° C., anneal) is shown on the left half 202 of the plot, and the data from Table 2 (the 600° C., anneal) is shown on the right half 204 of the plot. The graph 200 indicates that most of the candidate test cells had similar or only slightly reduced initial discharge capacity relative to the control test cells. Only the four candidate cells that included Al(Ac)₃ as the coating precursor showed significantly reduced discharge capacity relative to the control cells.

FIG. 2B is a graph 250 plotting the Coulombic efficiency (CE) for the 18 test cells identified in Tables 1 and 2. The data from Tables 1 and 2 are divided in halves as shown in FIG. 2A. The graph 250 shows that almost all of the candidate test cells, except for a few compositions including $Al(CH_3CO_2)_3$, had improved initial CE percentages than the control cells. Cycle performance of these 18 test cells was tested, and the results are shown in FIGS. 3A, 3B, 4A, 4B, 5A, and 5B.

Figure 3A:
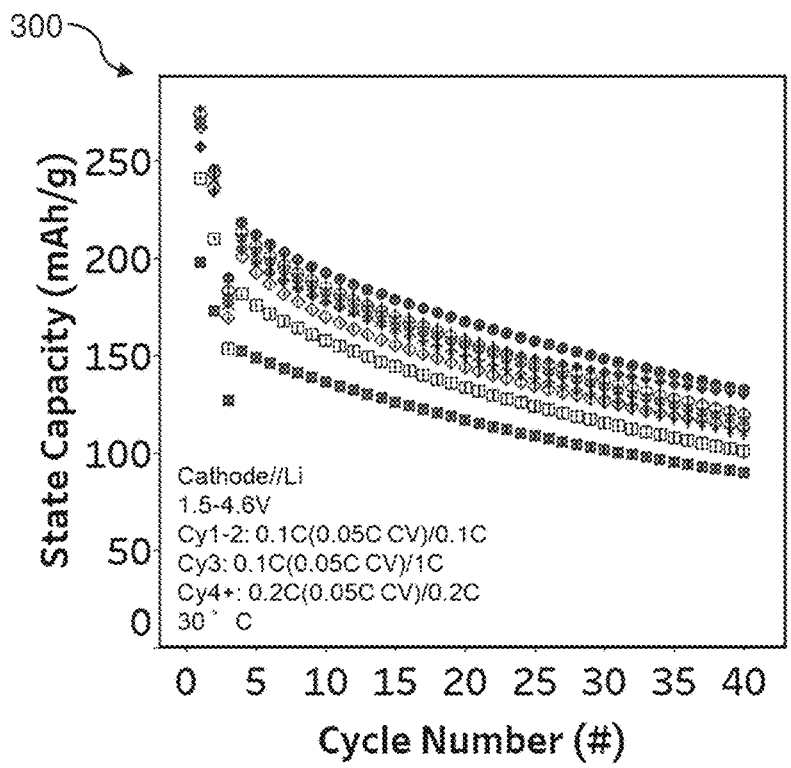
FIG. 3A is a graph plotting discharge capacity over cycle number for the candidate test cells and the control cell that are shown in Table 1, which are post-annealed at 300° C.
Figure 3B:
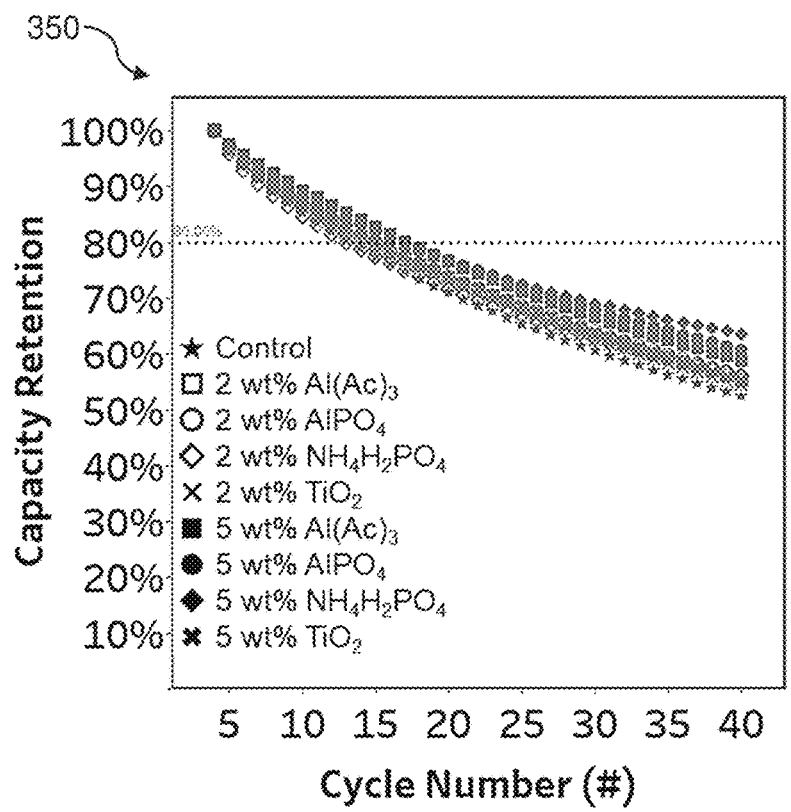
FIG. 3B is a graph plotting cycling capacity retention over cycle number for the candidate test cells and the control cell that are shown in Table 1 and FIG. 3A.
Figure 4A:
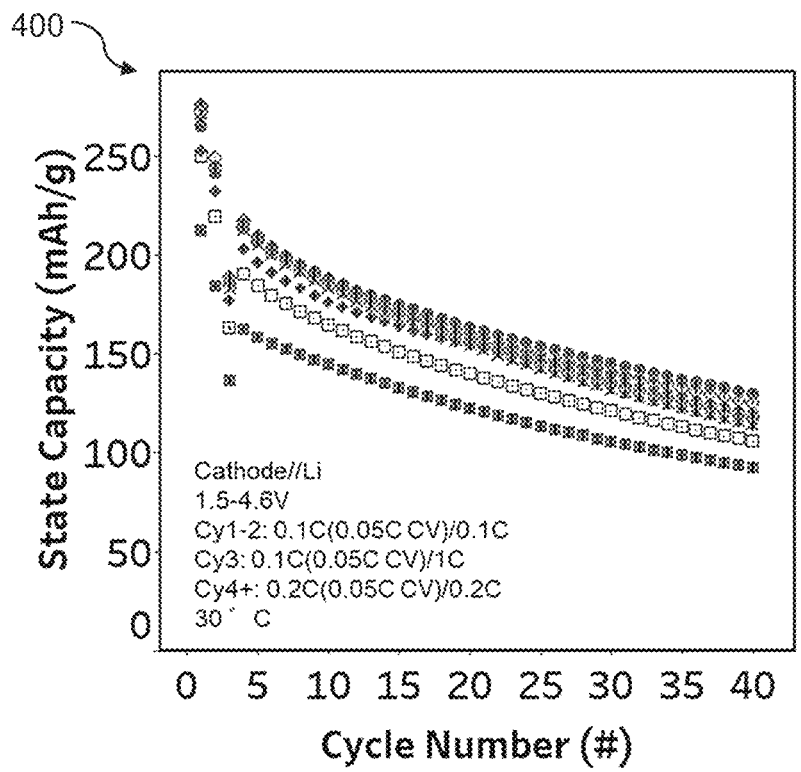
FIG. 4A is a graph plotting discharge capacity over cycle number for the candidate test cells and the control cell that are shown in Table 2, which are post-annealed at 600° C.
Figure 4B:
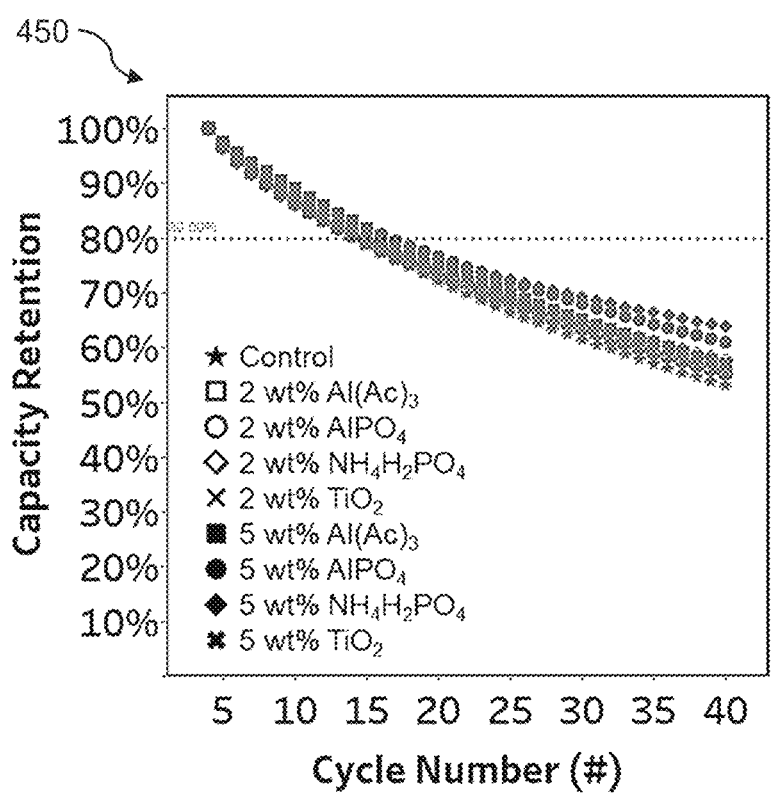
FIG. 4B is a graph plotting cycling capacity retention over cycle number for the candidate test cells and the control cell that are shown in Table 2 and FIG. 4A.

FIG. 3A is a graph 300 plotting discharge capacity over cycle number for the candidate test cells and the control cell that are shown in Table 1, which are post-annealed at 300° C. FIG. 3B is a graph 350 plotting cycling capacity retention over cycle number for the candidate test cells and the control cell that are shown in Table 1 and FIG. 3A. FIG. 4A is a graph 400 plotting discharge capacity over cycle number for the candidate test cells and the control cell that are shown in Table 2, which are post-annealed at 600° C. FIG. 4B is a graph 450 plotting cycling capacity retention over cycle number for the candidate test cells and the control cell that are shown in Table 2 and FIG. 4A.

FIGS. 3A, 3B, 4A, and 4B indicate that all of the candidate test cells, having coated disordered rocksalt cathode materials, provided improved cycle performance than the control test cells. The candidate test cells that included the phosphate precursors $AlPO_4$ and $NH_4H_2PO_4$ were generally observed to perform better than the oxide coating precursors. The candidate test cells that had 5 wt. % coatings were observed to generally have better cycle capacity retention than the 2 wt. % coatings under both post-annealing conditions, as shown in FIGS. 3B and 4B.

Figure 5A:
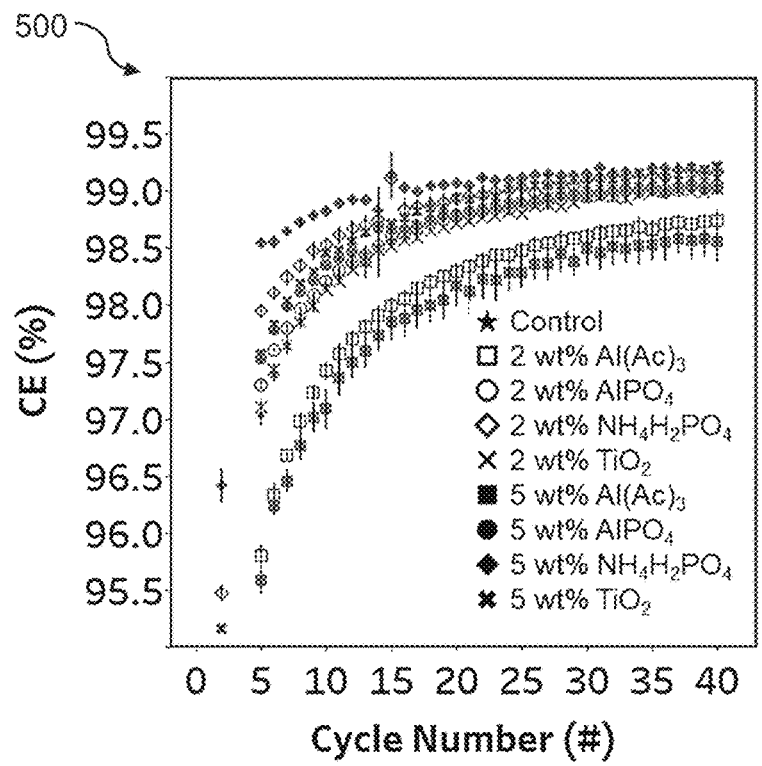
FIG. 5A is a graph plotting CE over cycle number for the candidate test cells and the control cell that are shown in Table 1, which are post-annealed at 300° C.
Figure 5B:
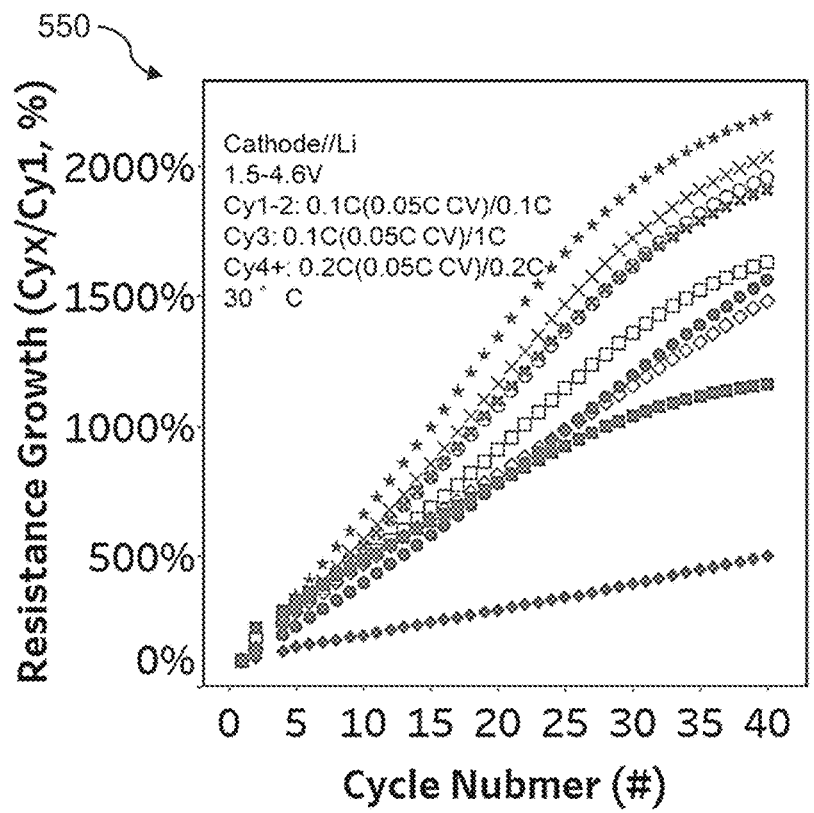
FIG. 5B is a graph plotting cell resistance growth over cycle number for the candidate test cells and the control cell that are shown in Table 1 and FIG. 5A.

FIG. 5A is a graph 500 plotting CE over cycle number for the candidate test cells and the control cell that are shown in Table 1, which are post-annealed at 300° C. FIG. 5B is a graph 550 plotting cell resistance growth over cycle number for the candidate test cells and the control cell that are shown in Table 1 and FIG. 5A. The resistance growth is shown as percentage of the resistance at a given cycle number relative to the resistance at the first or initial cycle ("Cyx/Cy1"). The trends plotted for cycling CE in FIG. 5A and cell resistance growth in FIG. 5B align well with the trend for cycling capacity retention shown in FIG. 2B. That is, the candidate test cells showed improved cycle performance over the control test cell with respect to CE and limiting cell resistance growth. The cycling CE and cell resistance growth for the candidate cells post-annealed at 600° C., are not plotted because the results are similar to the trends shown in FIGS. 5A and 5B.

The experimental results indicate that the candidate tests cells, which included the coated disordered rocksalt cathode materials according to the embodiments herein, showed superior cycling performance than the control cells that lacked coating on the disordered rocksalt cathode materials. For example, the coatings are believed to stabilize the disordered rocksalt surface which leads to better cycle performance. The fact that the candidate cells show greater initial CE and cycling CE than the control cells, when similar cycling capacity was obtained, is an indication that fewer side reactions occurred between the disordered rocksalt phase material and the electrolyte during charging. Although the candidate test cells, other than the cells with $Al(CH_3CO_2)_3$, were observed to have slightly less initial reversible capacity than the control, this difference is nominal and is overshadowed by the cycling performance gains. Although all coating precursors were shown to perform better than the control cells during cycling, the phosphate precursors AlPO$_4$ and NH$_4$H$_2$PO$_4$ generally performed slightly better than the oxide precursors, and therefore are preferred. The TiO$_2$ precursor generally performed better than the Al(CH$_3$CO$_2$)$_3$ precursor, so the TiO$_2$ is preferred over the Al(CH$_3$CO$_2$)$_3$.

Figure 6:
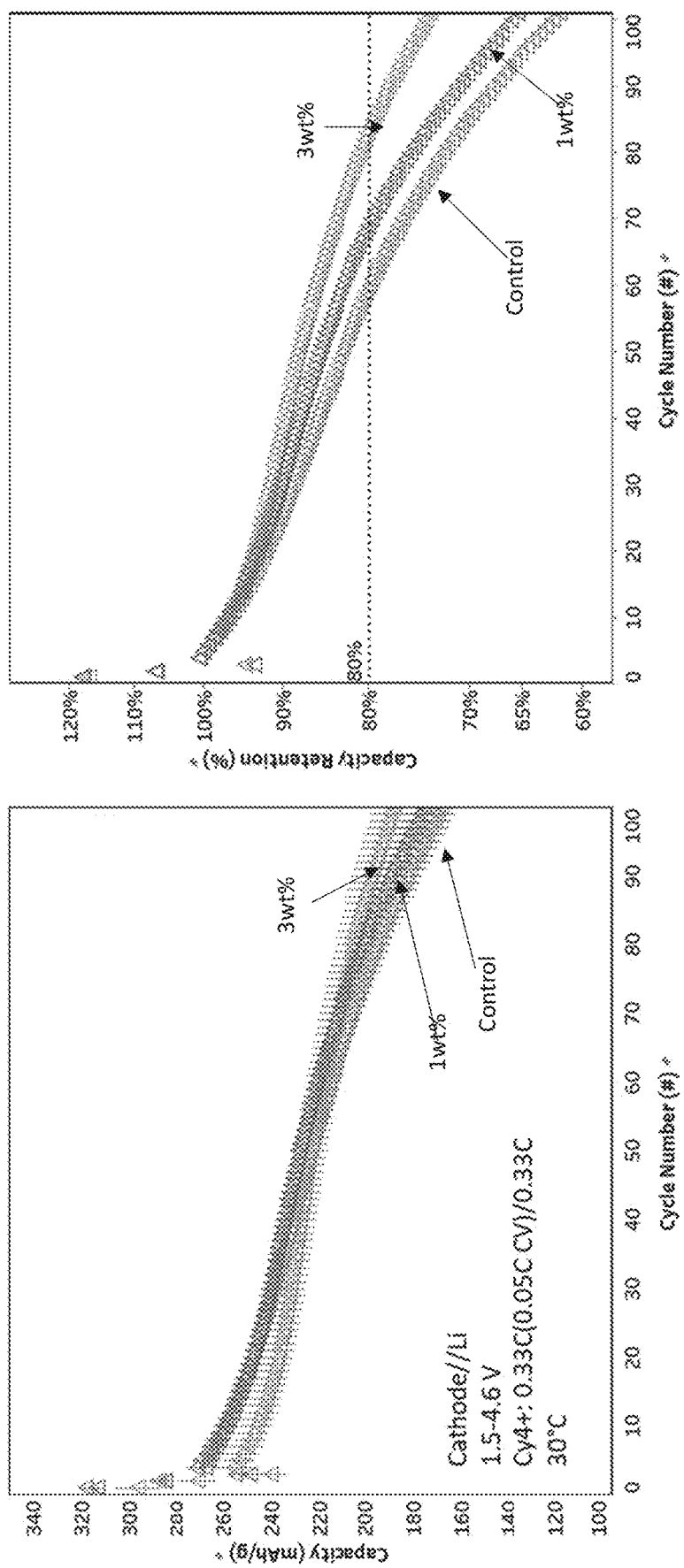
FIG. 6 graphically shows the capacity versus cycle and capacity retention versus cycle of half cells this invention having the coated disordered rocksalt and of a control not having a coated disordered rocksalt of this invention.

A separate experiment using a disordered rocksalt of the same composition, but of a different batch were coated in the same manner as described above with both a control and a coated disordered rocksalt formed using a phosphorous acid (H$_3$PO$_3$) precursor. The phosphorous acid amounts are 1% and 3% by weight of the disordered rocksalt and phosphorous acid. Likewise, ammonium dihydrogen phosphate (ADP) is repeated using the same disordered rocksalt and process as for the phosphorous acid coated disordered rocksalt at the same concentration. The phosphorous acid coated disordered rock salt was examined by scanning electron microscopy with energy dispersive x-ray analysis showing relative uniform distribution of phosphorous. The cycle performance of half cells without a coating (control) and the phosphorous acid coated disordered rocksalt cathodes and lithium metal anode are shown in FIG. 6. It is readily apparent that these coated disordered rocksalt cathode cells have substantially improved cycle life without sacrificing significant initial capacity. The ADP coated disordered rocksalt half cells improve the cycle performance, but not to the same degree as the phosphorous acid disordered rocksalt coated half cells. It is believed, without being limiting, that the phosphorous acid decomposes to form phosphoric acid and phosphine that reacts to form lithium phosphate (Li$_3$PO$_4$) and lithium phosphide (Li$_3$P), which may account for the improved performance. That is, it is believed, without being limiting in any way, that the presence of phosphine may be further beneficial for coating the disordered rocksalt cathode batteries.

Figure 7:
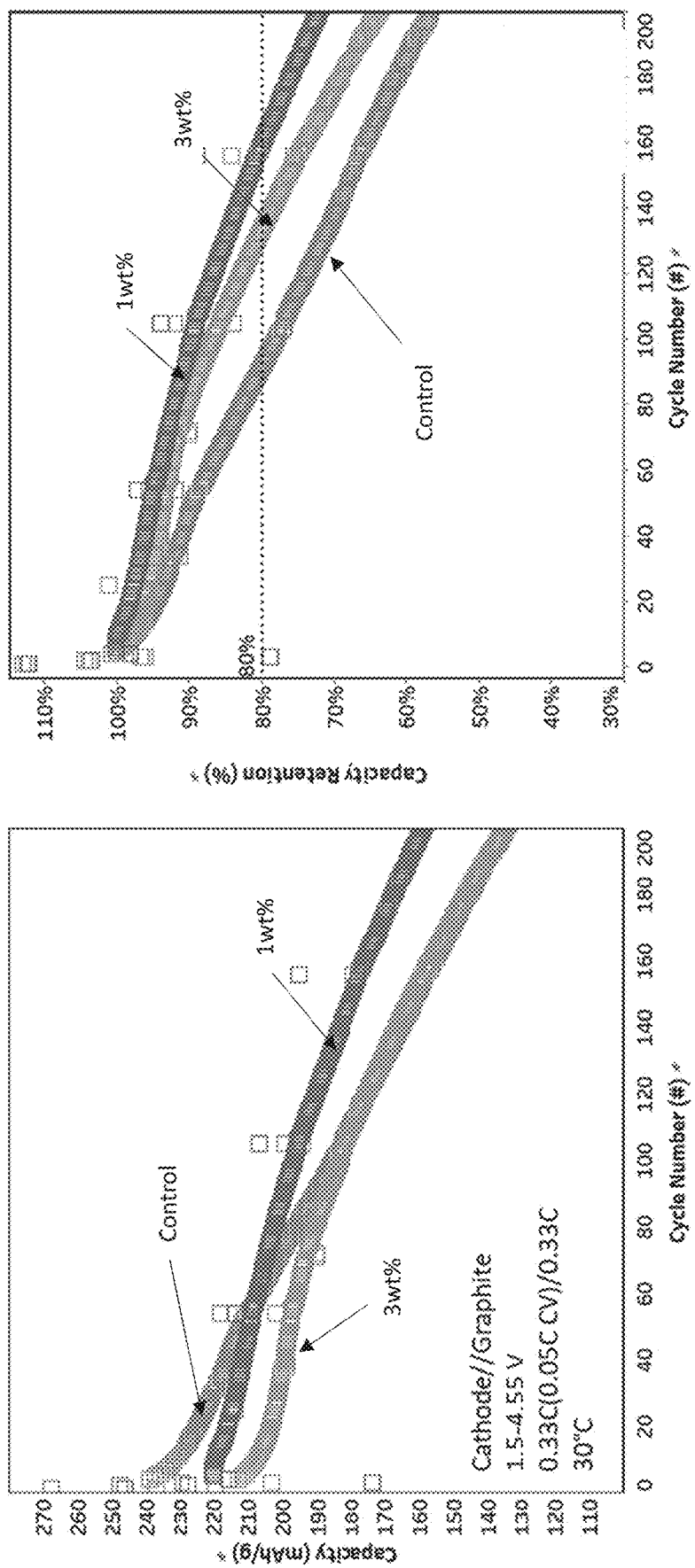
FIG. 7 graphically shows the capacity versus cycle and capacity retention versus cycle of full cells this invention having the coated disordered rocksalt and of a control not having a coated disordered rocksalt of this invention.

Full cells of the phosphorous acid coated disordered rock salt are made and show improved cycle performance compared to the half cells as shown in FIG. 7 achieving about double the lifetime of cells with uncoated disordered rocksalt cathodes (control).

As used herein, value modifiers such as "about," "substantially," and "approximately" inserted before a numerical value indicate that the value can represent other values within a designated threshold range above and/or below the specified value, such as values within 5%, 10%, or 15% of the specified value.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A cathode comprising:
   a disordered rocksalt phase material, and
   a coating layer disposed on a surface of the disordered rocksalt phase material, the coating layer comprising one or more of a titanium oxide, a lithium metal phosphate, lithium phosphate, a lithium metal oxide, a phosphide and a fluoride.

2. The cathode of claim 1, wherein the disordered rocksalt phase material is represented by chemical formula (i):

$$Li_xN_yM_zO_{b-a}F_a \quad (i)$$

where 1.0<x<1.65; 0≤y<0.55; 0.1<z<1; 0≤a<0.8; 1≤b≤3; N is one of Nb, Ti, Ta, Zr, W, Sb, or Mo; and M is one of Ti, V, Cr, Mn, Fe, Co, Ni, Cu, Zn, Al, Zr, Y, Mo, Ru, Rh, or Sb.

3. The cathode of claim 2, wherein b=2.

4. The cathode of any one of the preceding claims, wherein the coating layer is present at no less than 0.05 wt. % and no greater than 10 wt. % relative to a combined weight of the disordered rocksalt phase material and the coating layer.

5. The cathode of claim 4, wherein the coating layer is present from 1 to 5 wt. % relative to the combined weight of the disordered rocksalt phase material and the coating layer.

6. The cathode of claim 1, wherein the coating layer comprises one or more of LiAlO$_2$, Li$_3$Al$_2$(PO$_4$)$_3$, Li$_3$PO$_4$, Li$_3$P and Li$_2$TiO$_3$, TiO$_2$.

7. The cathode of claim 6, wherein the coating layer is comprised of Li$_3$PO$_4$ and Li$_3$P.

8. The cathode of claim 1, wherein the phosphide is a lithium metal phosphide, lithium phosphide or combination thereof.

9. The cathode of claim 8, wherein the metal of the lithium metal phosphate and lithium metal phosphide is a transition metal.

10. The cathode of claim 9, wherein said metal is a metal present in the disordered rocksalt.

11. A method for forming a cathode, the method comprising:
    mixing a disordered rocksalt phase material with one or more coating precursors to form a mixture, the one or more coating precursors comprising one or more of Al(CH$_3$CO$_2$)$_3$, a phosphate that decomposes during annealing to form a lithium phosphate or lithium metal phosphate, a lithium phosphide, lithium metal phosphide and $TiO_2$; and annealing the mixture to form a coated disordered rocksalt powder that has a coating layer disposed on a surface of the disordered rocksalt phase material.

12. The method of claim 11, wherein the one or more coating precursor is comprised of one or more of a phosphate that decomposes during annealing to form a lithium phosphate or lithium metal phosphate, a lithium phosphide, lithium metal phosphide and $TiO_2$ and the phosphate decomposes to form $Li_3PO_4$.

13. The method of claim 11, wherein the phosphate decomposes to form phosphine.

14. The method of claim 11, wherein during annealing phosphine is present.

15. The method of claim 14, wherein the phosphine reacts to form a phosphide.

16. The method of claim 11, wherein the coating layer that is formed comprises one or more of $LiAlO_2$, $Li_3Al_2(PO_4)_3$, $AlPO_4$, $Li_3PO_4$, $Li_3P$, and $Li_2TiO_3$, $TiO_2$.

17. The method of claim 11, wherein the annealing includes heating the mixture at a temperature no less than 200° C. and no greater than 800° C. for a duration no less than 0.5 hours and no more than 24 hours.

18. The method of claim 11, wherein the annealing includes heating the mixture in an inert gas.

19. The method of claim 11, further comprising milling the coated disordered rocksalt powder with one or more carbon precursors after the annealing to produce a cathode active material.

20. The method of claim 19, wherein the carbon precursor is comprised of carbon nanotubes.

* * * * *